S. P. M. TASKER.
Pipe-Coupling.

No. 217,249.   Patented July 8, 1879.

Attests
Inventor
Stephen P. M. Tasker,
By his Attorneys,

UNITED STATES PATENT OFFICE.

STEPHEN P. M. TASKER, OF PHILADELPHIA, PENNSYLVANIA.

IMPROVEMENT IN PIPE-COUPLINGS.

Specification forming part of Letters Patent No. 217,249, dated July 8, 1879; application filed June 2, 1879.

*To all whom it may concern:*

Be it known that I, STEPHEN P. M. TASKER, of the city and county of Philadelphia, in the State of Pennsylvania, have invented a new and useful Improvement in Pipe-Couplings, of which the following is a full, clear, and true description, reference being had to the accompanying drawings, forming part of this specification, of which—

Figure 1:
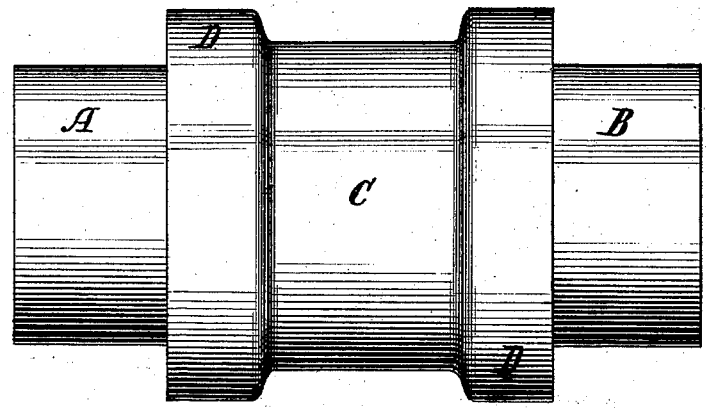
Figure 2:
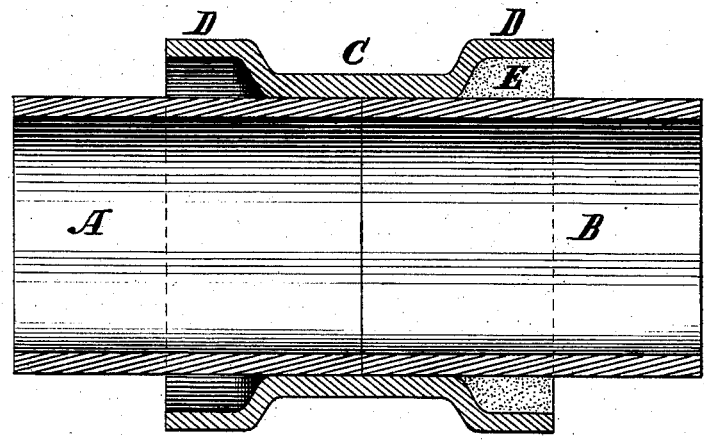

Figure 1 is a side elevation of a coupling embodying my invention; and Fig. 2, a central longitudinal sectional elevation of the same, the packing material, for clearer illustration, being shown applied to one bell-mouth only.

Similar letters of reference indicate corresponding parts wherever used.

My invention relates to the class of pipe joints or couplings in which the ends of the sections of pipe are of the same diameter and cut evenly off, so as to be brought butts together, and are then united by embracing devices, packed and not screw-threaded about the ends of the pipe.

It consists, substantially, in a pipe-coupling omposed of a collar fitting tightly to and jammed upon the contiguous ends of the pipe, the extremities of which collar are bell-mouthed, flared, or so otherwise shaped as to be of larger diameter than the central portion of the collar, into which portion the pipe ends are jammed, to the end that both bell-mouthed or flared extremities may be packed or filled with solder or other sealing material, so as to form a hermetical seal at each end of the coupling.

Of the drawings, A B represent two contiguous sections of pipe of the same diameter and evenly cut, so as to come to a butt-joint. C is the collar—a cylinder of metal—the interior diameter of the central portion of which is correspondent to the exterior diameter of the two extremities of pipe, so that the latter jam tightly within it. D D are the flared or otherwise enlarged end portions or bell-mouths of said collar, sufficiently larger inside or in their interior diameter than the exterior diameter of the pipes to leave an annular interspace around said pipes at both sides of the central portion, C, of the collar.

In order to couple the pipe when the ends of the sections thereof have been jammed into the collar, so as to come butts together, molten lead, solder, or other fit sealing or cementing material, E, is poured into each enlargement or annular interspace between the bell-mouths D, and the sections of pipe respectively overhung thereby, so as to completely fill the space up as far as the central portion, C, and to hermetically seal the collar in place.

It will be understood that the collar, being jammed upon the ends of the pipes, itself braces said ends together, while the bell-mouthed exteriors, when sealed up as described, re-enforce the central portion, so as to form together with it a compact and strong joint.

Having thus described my invention, I claim and desire to secure by Letters Patent of the United States—

The pipe-coupling hereinbefore described, which consists in a collar, C, provided with bell-mouths or enlarged extensions D at both its ends, the central portion of the collar being jammed upon the ends of the pipe, while the enlarged extremities are filled in and hermetically sealed by means of solder or other suitable material, all substantially as hereinbefore set forth.

In testimony whereof I have hereunto signed my name this 30th day of May, A. D. 1879.

STEPHEN P. M. TASKER.

In presence of—
J. BONSALL TAYLOR,
W. C. STRAWBRIDGE.